United States Patent
Igarashi et al.

(10) Patent No.: US 7,362,242 B2
(45) Date of Patent: Apr. 22, 2008

(54) OPTICAL ENCODER DEVICE FOR SMALL-SIZED MOTOR AND METHOD OF PRODUCING THE SAME

(75) Inventors: Kouhei Igarashi, Matsudo (JP); Masayuki Iida, Matsudo (JP)

(73) Assignee: Mabuchi Motor Co. Ltd., Chiba (JP)

( * ) Notice: Subject to any disclaimer, the term of this patent is extended or adjusted under 35 U.S.C. 154(b) by 0 days.

(21) Appl. No.: 11/610,088

(22) Filed: Dec. 13, 2006

(65) Prior Publication Data

US 2007/0146171 A1 Jun. 28, 2007

(30) Foreign Application Priority Data

Dec. 28, 2005 (JP) ............................. 2005-377335
Oct. 26, 2006 (JP) ............................. 2006-290808

(51) Int. Cl.
*H03M 1/22* (2006.01)
(52) U.S. Cl. .......................................... 341/13; 341/14
(58) Field of Classification Search .................. 341/13, 341/14, 17, 192
See application file for complete search history.

(56) References Cited

U.S. PATENT DOCUMENTS

| | | | | | |
|---|---|---|---|---|---|
| 3,815,126 | A | * | 6/1974 | Batz ................................. | 341/1 |
| 4,788,422 | A | * | 11/1988 | Fujiwara ................. | 250/231.13 |
| 4,819,051 | A | * | 4/1989 | Jacobson ....................... | 341/13 |
| 4,888,986 | A | * | 12/1989 | Baer et al. ................ | 73/170.09 |
| 4,965,503 | A | * | 10/1990 | Watanabe et al. ........... | 318/671 |
| 6,300,884 | B1 | * | 10/2001 | Wilson ........................... | 341/6 |
| 6,486,802 | B2 | * | 11/2002 | Watanabe ..................... | 341/13 |
| 6,534,762 | B1 | * | 3/2003 | Kieselbach et al. .... | 250/231.13 |
| 6,909,212 | B2 | * | 6/2005 | Uchiyama .................. | 310/68 B |
| 7,126,107 | B2 | * | 10/2006 | Ahne et al. ............ | 250/231.13 |
| 7,187,305 | B2 | * | 3/2007 | Ellis et al. ..................... | 341/14 |
| 2006/0061489 | A1 | * | 3/2006 | Ellis et al. ..................... | 341/13 |

FOREIGN PATENT DOCUMENTS

JP 2002-357457 12/2002

* cited by examiner

*Primary Examiner*—Linh Nguyen
(74) *Attorney, Agent, or Firm*—McGlew and Tuttle, P.C.

(57) ABSTRACT

A photosensor module is composed of a light-receiving element module accommodating a light-receiving element, and a light-emitting element module accommodating a light-emitting element, which modules are separate, paired components. One of the paired light-receiving element module and light-emitting element module is mounted on a printed circuit board of a board unit, which is fixed to an end surface of a motor. After a code wheel is attached and fixed to the motor shaft along the axial direction of the motor shaft, a generally L-shaped module holder, which accommodates the other of the paired light-receiving element module and light-emitting element module, is mounted to the board unit. Thus, the light-emitting element and the light-receiving element are positioned such that these elements face each other via the optical modulation track portion of the code wheel.

6 Claims, 8 Drawing Sheets

FIG. 3A
BACK SURFACE

FIG. 3B
FRONT SURFACE

FIG. 4
BOARD UNIT

LIGHT-RECEIVING ELEMENT MODULE

POSITIONING PROJECTION

FIG. 7B

LIGHT-RECEIVING ELEMENT MODULE

POSITIONING PROJECTION

PRINTED CIRCUIT BOARD

FIG. 7C

LIGHT-EMITTING ELEMENT MODULE

LIGHT-EMITTING ELEMENT MODULE HOLDER

CODE WHEEL

MODULE ENGAGEMENT PORTION

LIGHT-RECEIVING ELEMENT MODULE

LIFTING PEVENTION PORTION

PRINTED CIRCUIT BOARD OF BOARD UNIT

FIG. 8

LIGHT-EMITTING ELEMENT MODULE HOLDER

MODULE FIXING PORTION

MODULE ENGAGEMENT PORTION

LIGHT-RECEIVING ELEMENT MODULE

LIFTING PREVENTION PORTION (CLAW PORTION)

MODULE FIXING PORTION

HOOK PORTION

PHOTOSENSOR MODULE

FIG. 12C
PRIOR ART

CODE WHEEL

OPTICAL ENCODER DEVICE FOR SMALL-SIZED MOTOR AND METHOD OF PRODUCING THE SAME

BACKGROUND OF THE INVENTION

1. Field of the Invention

The present invention relates to an optical encoder device for a small-sized motor which includes a code wheel attached to a motor shaft and disposed between a light-emitting element and a light-receiving element and which optically detects rotation of the motor shaft, and to a method of producing the optical encoder device.

2. Description of the Related Art

There is demand for attaching, to a small-sized motor, a device for detecting the rotational speed and position of the motor. Known detecting devices of this kind perform magnetic detection by use of a magnet and a Hall element, mechanically turn on/off electrical continuity between two brushes, or perform optical detection by use of a photodiode (light-emitting element) and a phototransistor (light-receiving element). The present invention relates to an optical encoder device of this type. A small-sized motor having such an optical encoder device can be used in OA apparatus which requires rotational control, such as a printer.

Figure 11A:
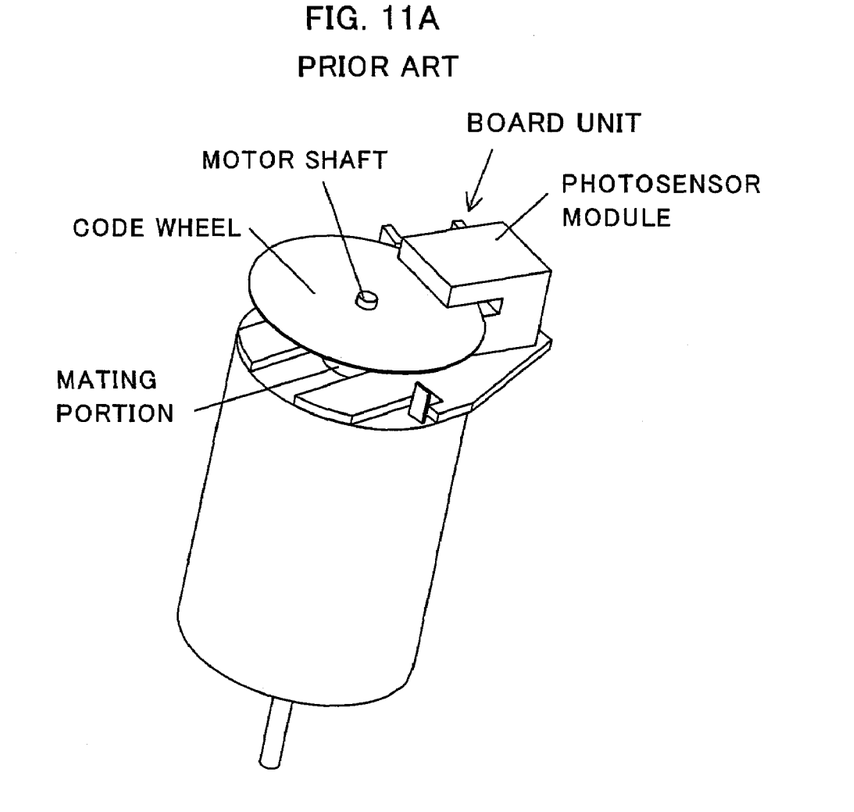
FIGS. 11A and 11B are views showing a first conventional technique of attaching an optical encoder to a motor.
Figure 11B:
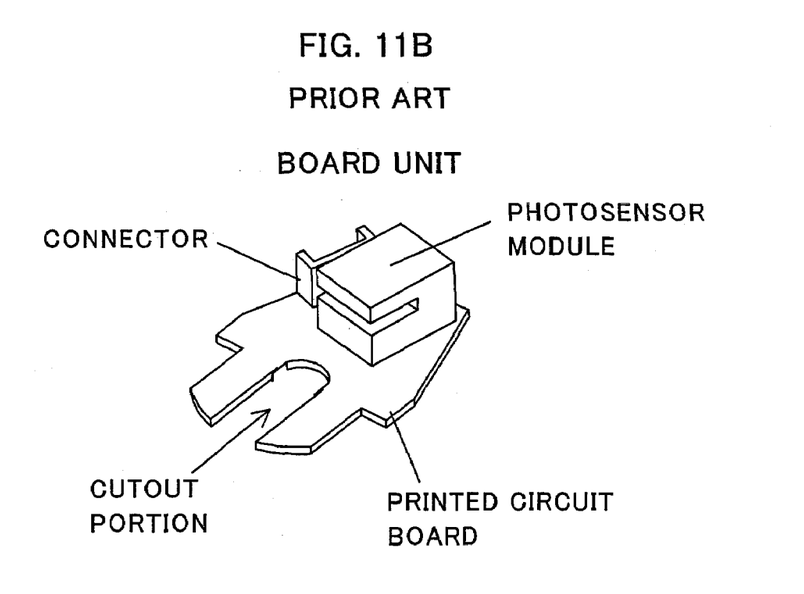

FIGS. 11A and 11B illustrate a first conventional technique of attaching an optical encoder to a motor (see, for example, Japanese Patent Application Laid-Open (kokai) No. 2002-357457). FIG. 11A shows a small-sized motor including an integrally assembled a board unit, and FIG. 11B shows the board unit alone. A printed circuit board, which partially constitutes the board unit, has a U-shaped cutout. The board unit having the cutout is moved laterally for attachment to the motor after a code wheel is attached to a motor shaft. In a completed state shown in FIG. 11A, the code wheel having an optical modulation track is disposed in a gap of a photosensor module, which is formed by opposed light-emitting and right-receiving elements, so as to obtain a signal indicating rotation of the motor shaft. The illustrated photosensor module is configured such that light-emitting and light-receiving elements are disposed to face each other and are integrated together, as in the case of a second conventional technique (see FIG. 12B), which will be described later.

Since the code wheel must be disposed in the gap of the integrally formed photosensor module, the code wheel is first attached to an end portion of the motor shaft, and a board unit carrying the photosensor module as shown in FIG. 11B is then moved, positioned, and fixed from a direction perpendicular to the motor shaft such that a mating portion of the motor enters the cutout of the board unit.

As described above, the illustrated structure enables the board unit to be moved, positioned, and fixed from a direction perpendicular to the motor shaft. Therefore, the photosensor module can be attached and fixed to a predetermined position, without damaging the code wheel during the attachment of the photosensor module, which damage would otherwise occur upon contact of the photosensor module with the code wheel.

However, when a cutout is provided on the printed circuit board, the cutout becomes a dead space. Therefore, the degree of integration of patterns formed on the printed circuit board cannot be increased, and thus, the size of the board must be increased.

Figures 12A, 12B, 12C, 12D:
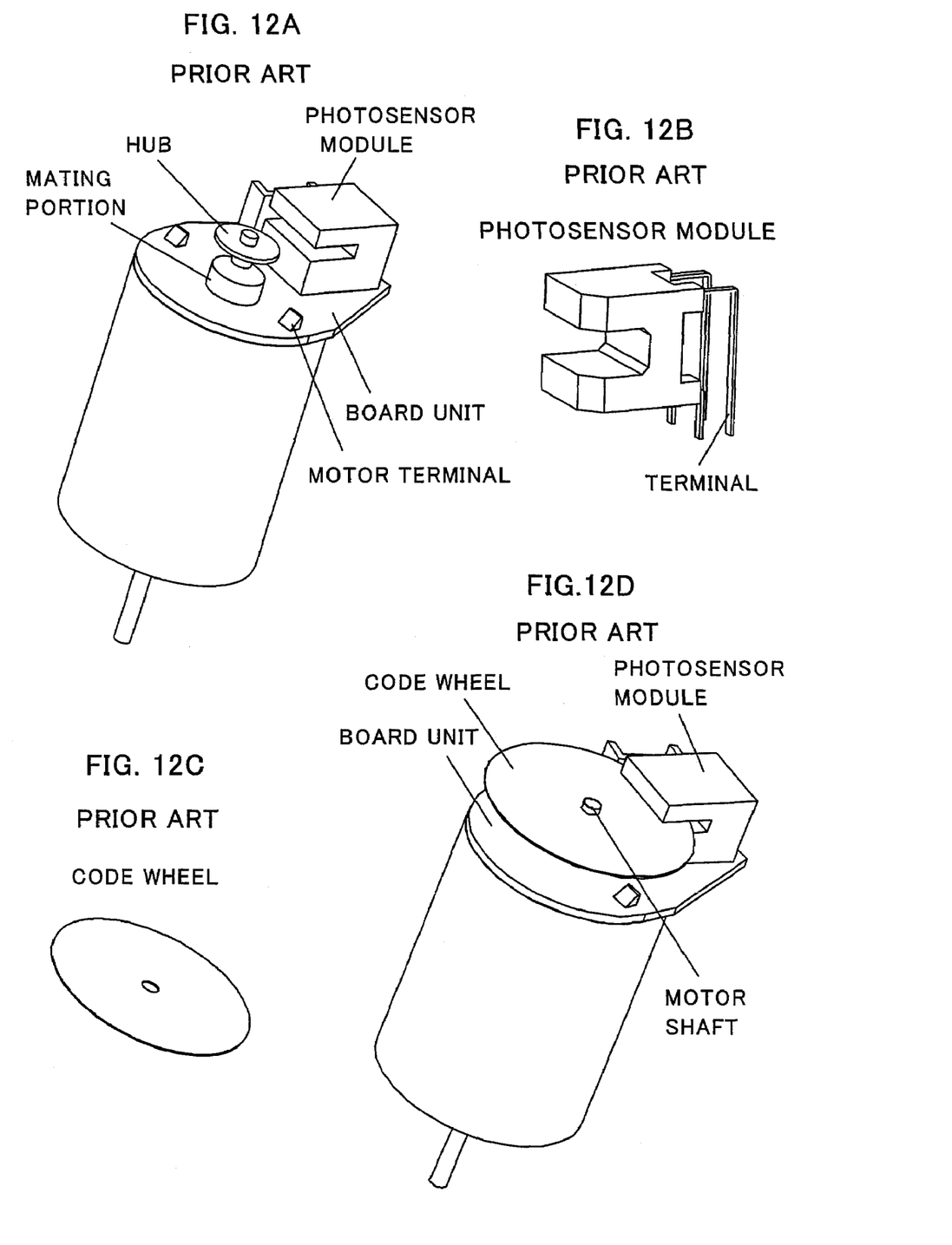
FIGS. 12A to 12D are views showing a second conventional technique of attaching an optical encoder to a motor.

FIGS. 12A to 12D illustrate a second conventional technique of attaching an optical encoder to a motor. FIG. 12A is a perspective view of a small-sized motor to which a board unit is attached. FIG. 12B shows a photosensor module only, and FIG. 12C shows a code wheel alone. FIG. 12D is a perspective view of the small-sized motor in a state where assembly of the optical encoder is completed. As shown in FIG. 12B, the conventional photosensor module is configured such that light-emitting and right-receiving elements are disposed to face each other and are integrated together, and terminals extending from these elements are fixed to the board unit by means of soldering. The remaining elements, such as a connector, are fixed to the board unit to thereby complete the board unit as an independent unit.

In assembly, as shown in FIG. 12A, the board unit is first attached to the motor. The board unit has holes corresponding to a mating portion and motor terminals provided on the motor. The board unit can be attached to the motor along the axial direction of the motor shaft. A code-wheel-fixing hub is secured to the motor shaft. Subsequently, a code wheel as shown in FIG. 12C is positioned laterally on the hub such that a peripheral portion of the code wheel is inserted into a gap of the photosensor module, and bonded to the hub by means of double-sided tape.

Since the code wheel is inserted laterally while being bended as described above, the code wheel must be made of a transparent material having elasticity, such as polyethylene terephthalate (PET) resin film. When the code wheel is formed of such a transparent material having elasticity, an expensive special film on which an optical modulation track can be formed must be used. In addition, due to dimensional restriction at the time of insertion of the code wheel into the gap of the photosensor module while bending the code wheel, the code wheel and the hub (via which the code wheel is fixed to the motor shaft) must be formed as separate members, and double-sided tape must be used so as to join them together. As described above, the structures according to the conventional techniques increase product cost considerably, because of cost of various components and a large number of assembly steps.

SUMMARY OF THE INVENTION

The present invention has solved the above-described problem, and an object of the present invention is to provide an optical encoder device for a small-sized motor which enables a code wheel to be attached to a shaft of the motor through movement along the axis of the motor shaft, without requiring formation of a cutout in a circuit board, which cutout would otherwise produce a dead space. Thus, the present invention enables use of an inexpensive, rigid code wheel which is assembled integrally with a hub.

Another object of the present invention is to provide a method of producing an optical encoder device according to the present invention.

The present invention provides an optical encoder device for a small-sized motor which includes a code wheel attached to a motor shaft extending outward from a motor, and a photosensor module for detecting rotation of an optical modulation track of the code wheel. The present invention also provides a method of producing such an optical encoder device. The photosensor module is composed of a light-receiving element module accommodating a light-receiving element, and a light-emitting element module accommodating a light-emitting element, which modules are separate, paired components. One of the paired light-receiving element module and light-emitting element module is mounted on a printed circuit board of a board unit. The board unit is fixed to an end surface of the motor by means of soldering a pair of motor terminals passing through the board unit to corresponding printed wiring traces of the printed circuit board. After the code wheel is axially attached and fixed to the motor shaft, a generally L-shaped module holder, which accommodates the other of the paired light-receiving element module and light-emitting element module, is mounted to the board unit. The light-emitting element and the light-receiving element are positioned such that these elements face each other via the optical modulation track portion of the code wheel. Positioning of the module holder in relation to the light-receiving element module or the light-emitting element module mounted on the board is performed by means of engaging hook portions and lifting prevention portions of the module holder with corresponding holes provided in the printed circuit board.

Mutual positioning of the paired element modules in a front-rear direction is performed by fixing one element module and the module holder accommodating the other element module to the printed circuit board. Mutual positioning of the paired element modules in a height direction is performed by bringing the one element module in engagement with a module engagement portion provided on the module holder. Mutual positioning of the paired element modules in a lateral direction is performed by sandwiching opposite lateral side surfaces of the one element module from the two sides by module fixing portions of the module holder provided at laterally opposite ends of the module holder.

According to the present invention, since a cutout is not required to be formed in the printed circuit board, the degree of integration of printed patterns can be increased. Therefore, the size of the board can be reduced for miniaturization. In addition, according to the present invention, since the code wheel can be attached along the axial direction of the motor shaft, an inexpensive code wheel with an integrally formed attachment hub can be used. Moreover, since assembly of the encoder device can be performed by stacking components in one direction, higher productivity is achieved.

DESCRIPTION OF THE PREFERRED EMBODIMENTS

Figure 1:
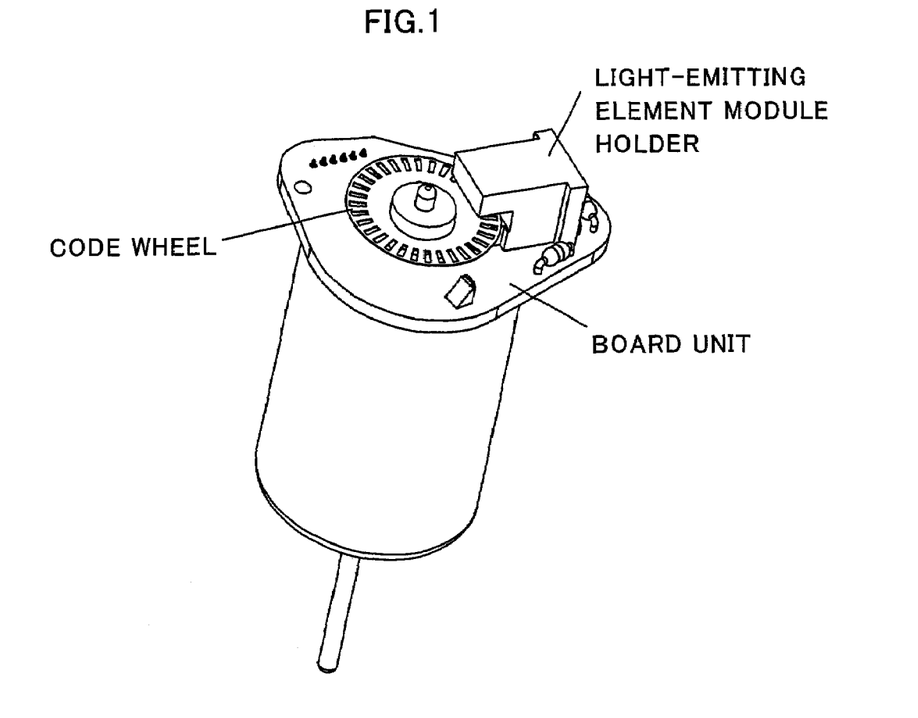
FIG. 1 is a perspective view showing the overall structure of a completed motor equipped with an optical encoder.

The present invention will now be described by way of examples. FIG. 1 is a perspective view showing the overall structure of a completed motor equipped with an optical encoder. First, there is prepared a board unit on which a light-receiving element (photo transistor) module has been mounted, but a light-emitting element module holder, which accommodates a light-emitting element (LED) module, has not yet been mounted. The board unit is then mounted to the motor. Subsequently, a code wheel is attached to the motor shaft, and finally, the light-emitting element module holder is mounted and soldered, whereby assembly is completed. Since the code wheel is attached before the light-emitting element module holder is mounted as described above, an inexpensive, rigid code wheel, in which a disk portion having an optical modulation track and a centrally located flange portion are integrally formed, can be used. Such a code wheel can be attached to the motor shaft along the axial direction of the motor shaft. The light-emitting element module holder assumes a generally L-like shape, which enables the light-emitting element module holder to be placed on the printed circuit board from a position above the light-receiving element module through movement in the thrust direction. The light-emitting element module holder is fixed to the board unit by use of hooks. As described above, the photosensor module of the present invention is constructed by integrally assembling the light-receiving element module and the light-emitting element module, which are separate components, on the board unit.

Figure 2:
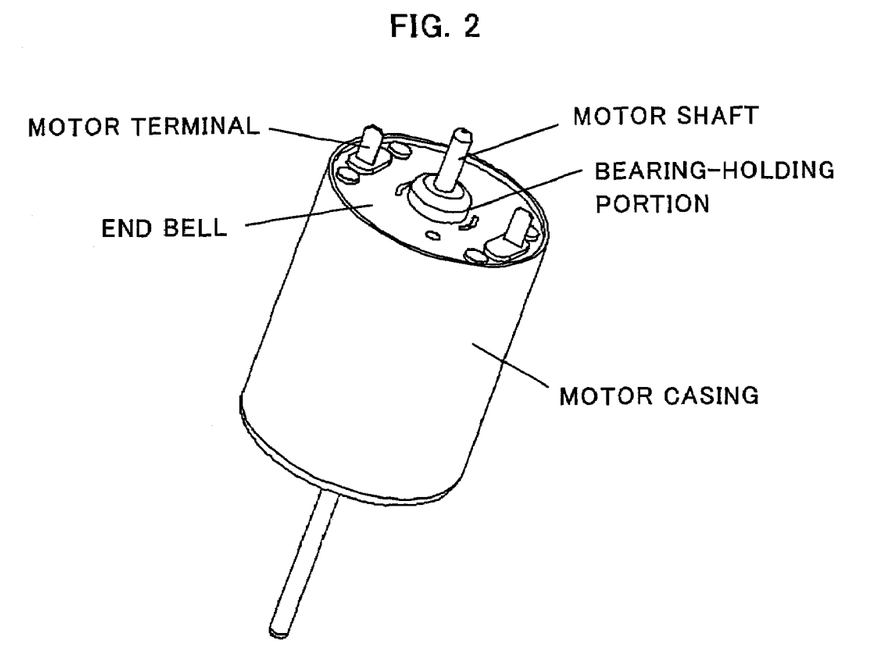
FIG. 2 is a perspective view showing a small-sized motor before attachment of a board unit thereto.

Next, step-by-step assembly of the motor equipped with an optical encoder exemplified in FIG. 1 will be described. FIG. 2 is a perspective view showing the small-sized motor before the board unit is mounted thereto. Although not illustrated, magnets serving as stator magnetic poles are disposed inside the casing of the motor, and a rotor is rotatably mounted. The rotor includes rotor poles and a commutator which are integrally mounted on the motor shaft. The rotor poles are formed by a laminated core and windings. The rotor integrally assembled on the motor shaft is inserted into the motor casing, assuming the shape of a bottomed hollow cylinder, from an opening thereof. Subsequently, an end bell is attached to the motor housing so as to close the opening thereof. The motor shaft is supported by means of bearings located at the center of the bottom wall of the motor casing and at the center of the end bell, respectively. The bearing on the end bell side is accommodated within a bearing-holding portion formed integrally with the end bell. A pair of brushes in contact with the commutator are connected to a pair of motor terminals extending to the outside of the end bell. Such a small-sized motor itself has an ordinary structure.

Figure 3A:
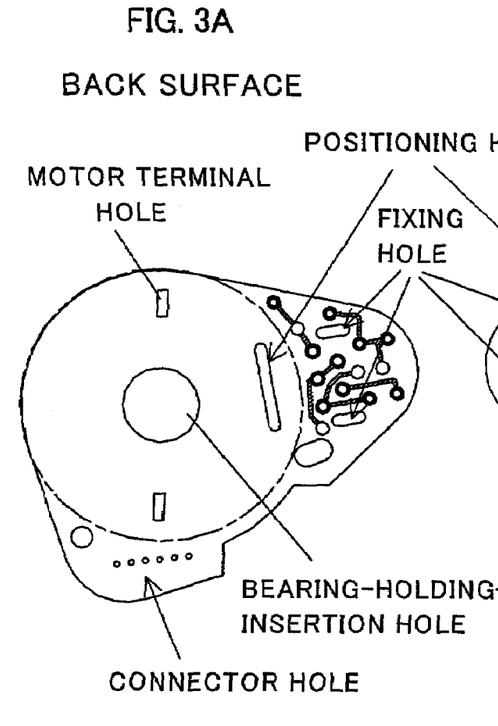
FIG. 3 is a pair of views respectively showing printed wiring traces on back and front surfaces of a printed circuit board.
Figure 3B:
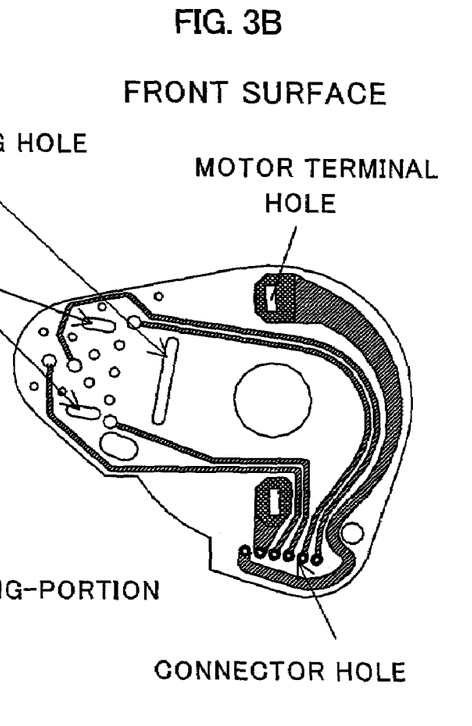
Figure 4:
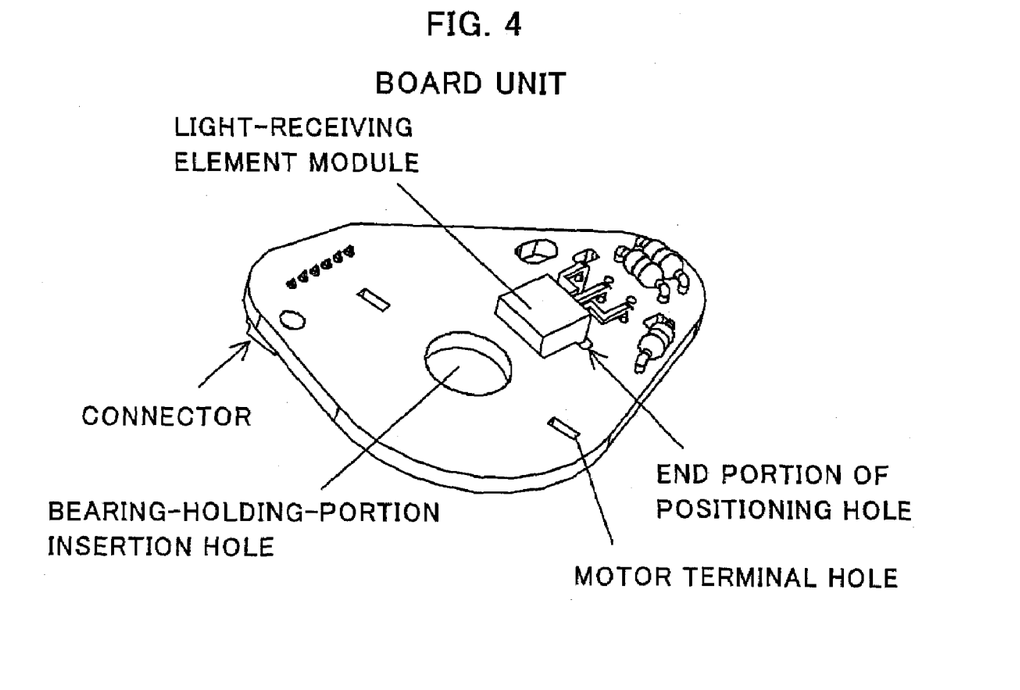
FIG. 4 is a perspective view of a board unit as viewed from the front surface side.

FIGS. 3A and 3B are views respectively showing printed wiring traces on a back surface (facing the motor end bell) and a front surface of a printed circuit board. The illustrated printed circuit board is of a type which includes printed wiring traces on both the front and back surfaces. FIG. 4 is a perspective view of a board unit, as viewed from the front surface side, on which elements, such as a light-receiving element module, have been attached and soldered to the printed circuit board so as to complete the board unit.

The printed circuit board includes a bearing-holding portion insertion hole, a pair of motor terminal holes, holes for a connector, holes for light-emitting element and light-receiving element modules, and other necessary holes. Terminals of relevant elements, etc. are inserted into these holes and fixed. Although most elements, such as the light-receiving element module and the connector, are mounted to the board unit, the light-emitting element module holder, which accommodates the light-emitting element module, has not yet been mounted to the board unit. In the illustrated example, the connector, which accommodates a pair of terminals for supplying electrical power to the motor, a pair of terminals for supplying electrical power to the light-emitting element, and a pair of terminals for outputting a signal from to the light-emitting element, is mounted on the back surface side of the board unit. Such a board unit is fixedly attached to the end face of the motor as shown in FIG. 2. In the course of attachment, the motor terminals and the bearing-holding portion are inserted into the corresponding holes provided on the board unit, and the motor terminals are then soldered to the corresponding printed wiring traces on the front surface of the board unit. Thus, the board unit is secured.

Figure 5:
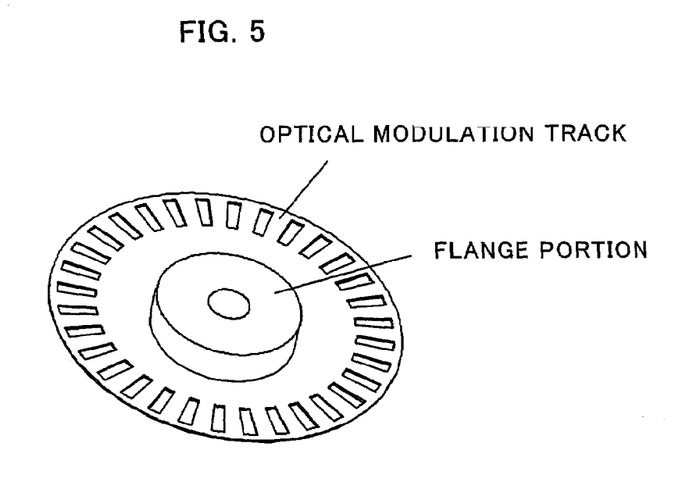
FIG. 5 is a perspective view of an exemplary code wheel.

FIG. 5 is a perspective view of an exemplary code wheel. A code wheel is fixedly attached to the shaft of the motor, to which the board unit has been fixedly attached as described above, through movement along the axial direction of the motor shaft. More specifically, the code wheel is positioned and fixed, by means of press-fit or any other suitable method, to an extended portion of the motor shaft, which passes through the end-bell-side bearing-holding portion and the board unit and extends to the outside of the motor. Notably, in the case where the code wheel is press fit, preferably, a center flange portion of the code wheel (formed of, for example, stainless steel) is formed of resin. Alternatively, the flange portion may be formed of iron, brass, or aluminum in consideration of strength. In either case, an inexpensive code wheel in which a flange portion is integrated with the code wheel (with a disk portion of the code wheel) can be used. The code wheel itself has an ordinary structure, and as shown in FIG. 5, includes an optical modulation track in which a plurality of slits are provided at uniform intervals in the circumferential direction. The code wheel is designed to generate a signal composed of pulses (e.g., about 50 pulses per revolution) with rotation of the motor shaft. Light emitted from one side of the code wheel is received on the other side of the code wheel. The transmission of light is alternately permitted and prohibited by slit portions and non-slit portions of the rotating code wheel, whereby rotational speed and position can be detected.

Figure 6A:
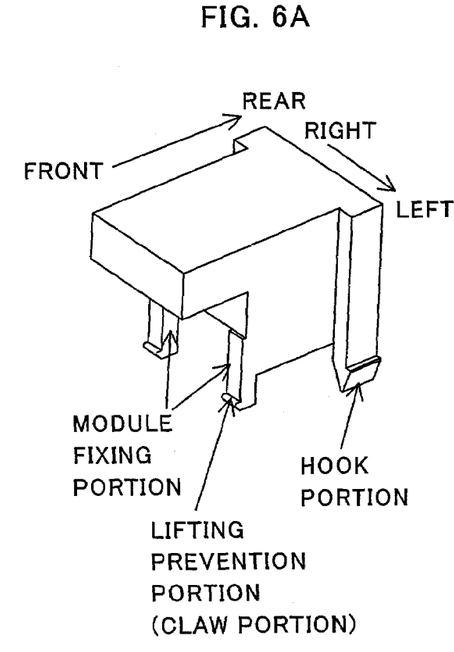
FIGS. 6A and 6B are perspective views showing an exemplary structure of a light-emitting element (LED) module holder, as viewed from different directions.
Figure 6B:
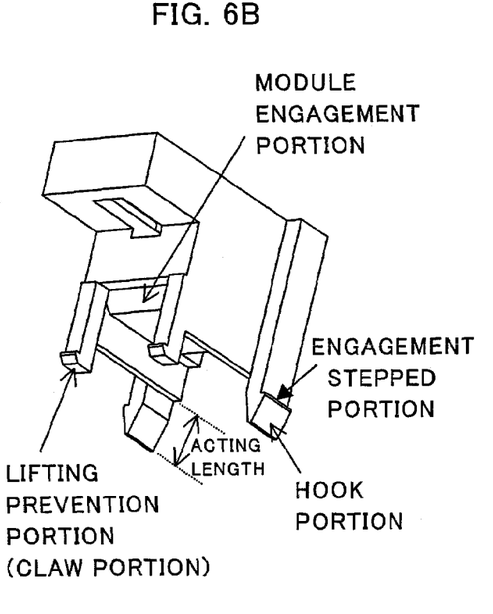
Figure 7A:
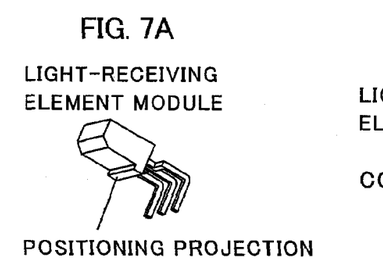
FIGS. 7A to 7C are views showing attachment of the light-emitting element module holder, which includes a light-emitting element module, to the board unit carrying a light-receiving element module mounted thereon.
Figure 7B:
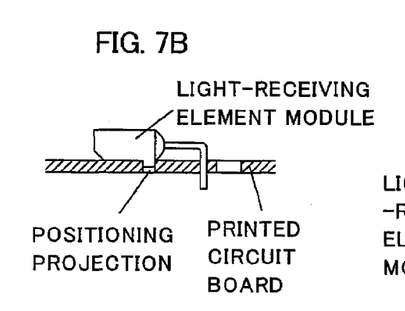
Figure 7C:
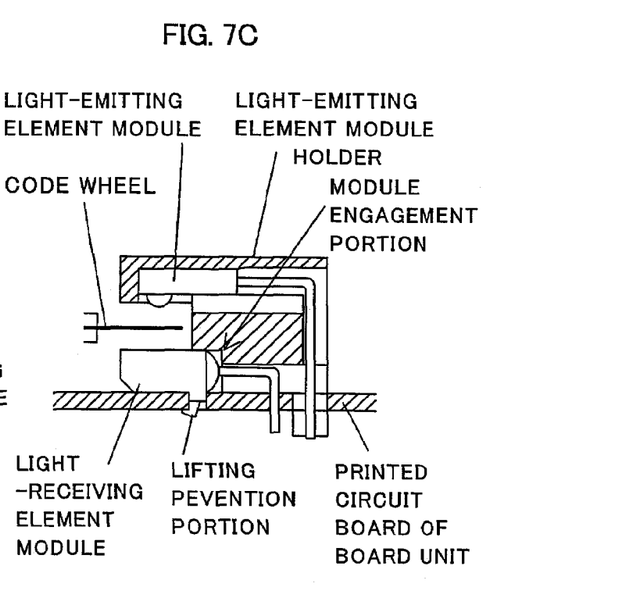

FIGS. 6A and 6B are views showing an exemplary structure of a light-emitting element (LED) module holder, as viewed from different directions. FIGS. 7A to 7C are views showing a method for attaching the light-emitting element module holder including a light-emitting element module, to the board unit, to which a light-receiving element module including a light-receiving element has already been mounted. FIG. 7A shows the light-receiving element module alone. FIG. 7B shows a state where the light-receiving element module is fixed to the printed circuit board of the board unit. FIG. 7C is a partial cross section showing a state where both the light-receiving element module and the light-emitting element module holder are attached to the printed circuit board. The terms "light-receiving element module" and "light-emitting element module" refer to modules accommodating a light-receiving element and a light-emitting element, respectively. Further, a holder accommodating this light-emitting element module is referred to as a light-emitting element module holder. The light-emitting element module holder assuming a generally L-like shape is positioned and disposed while being combined with the light-receiving element module such that the light-emitting element and the light-receiving element face each other. An optical modulation track portion of the code wheel is positioned and disposed in a gap between the facing light-emitting and light-receiving elements. This positioning is achieved by properly determining the positions of respective mounting holes for the light-receiving element module and the light-emitting element module holder provided in the printed circuit board.

Attachment of the light-receiving element module is performed as follows. A positioning projection of the light-receiving element module is engaged with a positioning hole (see FIG. 3) provided in the printed circuit board, and terminals of the light-receiving element module are passed through the corresponding holes of the printed circuit board and soldered to the corresponding printed wiring traces on the back surface side. In this manner, the light-receiving element module is positioned and fixed.

The light-emitting element module holder, which is larger than the light-receiving element module, can be positioned and fixed by use of lifting prevention portions, in addition to fixing by hook portions and soldering of the terminals. The lifting prevention portions are inserted into the positioning hole of the printed circuit board such that claw portions at their ends are engaged with the back surface of the board, so as to position the light-emitting element module holder at the front side thereof, and to prevent lifting from the printed circuit board. The length of the positioning hole of the board (see FIG. 3) is greater than the width of the light-receiving element module. Therefore, when the positioning projection of the light-receiving element module is engaged with the positioning hole of the printed circuit board, portions of the positioning hole located on opposite sides of the light-receiving element module remain unoccupied (see FIG. 4). The lifting prevention portions are inserted into and engaged with the unoccupied end portions of the positioning hole, whereby the light-receiving element module is reliably positioned and fixed by means of module fixing portions of the light-emitting element module holder, whereby lateral movement of the light-receiving element module is prevented.

Since the light-emitting element module holder is formed such that it has a generally L-like shape (as viewed in a side view of FIG. 7C), the light-emitting element module holder can be assembled through a simple operation of inserting it from a position above the light-receiving element module with respect to the height direction of the light-receiving element module (the motor thrust direction). The two lifting prevention portions provided at left and right ends of the front side (the same side as the side where light is emitted and received for detection thereof) of the light-emitting element module holder are engaged with the positioning hole of the printed circuit board, and the two hook portions provided at left and right ends of the rear side are engaged with the corresponding fixing holes of the printed circuit board. Tip ends of the hook portions are formed into a triangular shape such that the hook portions can be press-fitted to the board over a short acting length. When the hook portions are press-fitted to the board, the hooks engage the board by means of elastic force of the hooks themselves, and engagement stepped portions provided on the hook portions come into engagement with the back surface of the printed circuit board. Since the hook portions are formed at positions where they do not overlap legs of the lifting prevention portions as viewed from the front side of the light-emitting element module holder, the light-emitting element module holder can be molded by use of a mold of a single-direction open type. The lifting prevention portions prevent lifting of the light-emitting element module holder. Preferably, the light-emitting element module holder, including the hook portions, is integrally molded by use of a resin having a high bending strength, such as polycarbonate.

Figure 8:
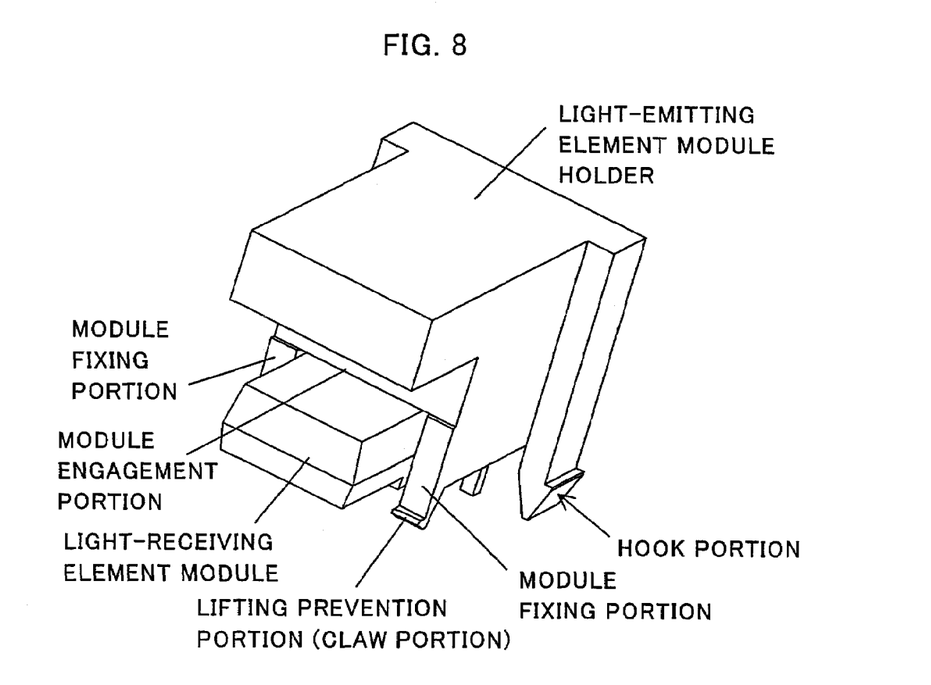
FIG. 8 is a perspective view showing the relative positional relation between the light-receiving element module and the light-emitting element module holder.

Although the mutual positioning of the light-receiving element module and the light-emitting element module holder can be performed through proper positioning and fixing of the module and the holder to the printed circuit board, the light-receiving element module and the light-emitting element module holder are also positioned each other in the height direction because, as shown in FIG. 7C, an upper rear portion of the light-receiving element module comes into contact with a module engagement portion provided on the light-emitting element module holder. The positioning of the light-receiving element module in relation to the light-emitting element module holder in the front-rear direction is performed by means of the positioning hole of the board. The positioning of the light-receiving element module in the height direction (vertical direction) is performed by the module engagement portion of the light-emitting element module holder. Moreover, the mutual positioning of the light-receiving element module and the light-emitting element module holder in the left-right direction or lateral direction (in the circumferential direction of the motor shaft) is performed by the module fixing portions provided at the opposite ends of the front face of the light-emitting element module holder and adapted to sandwich the opposite side surfaces of the light-receiving element module from both sides as shown in FIG. 8. Accurately performing the relative positioning of the light-emitting element and the light-receiving element in the photosensor module is very important, because the module is used as a sensor. The above-described structure for relative positioning enables accurate positioning for relative arrangement of the light-emitting element and the light-receiving element even though they are separate components of the photosensor module.

FIG. 8 is a perspective view showing the relative positional relation between the light-receiving element module and the light-emitting element module holder. The distance between the two module fixing portions of the light-emitting element module holder is approximately equal to the width of the light-receiving element module, and the light-receiving element module is accommodated between the two module fixing portions. No problem arises even when a slight clearance (gap) (e.g., 0.2 mm or less) is formed between one side surface of the accommodated light-receiving element module and the corresponding module fixing portion, provided that the clearance does not affect the operation of the photosensor; i.e., transmission and reception of a light signal. In short, the dimension of the clearances between the light-receiving element module and the module-fixing portions must be designed to satisfy the above-described requirement. As shown in the drawings, the light-receiving element module is held vertically by means of the module engagement portion and is held laterally by means of the module fixing portion, whereby the light-receiving element module is positioned in relation to the light-emitting element module holder. In this manner, the light-emitting element module holder can be assembled through movement in the thrust direction (height direction) without use of adhesive.

Figure 9:
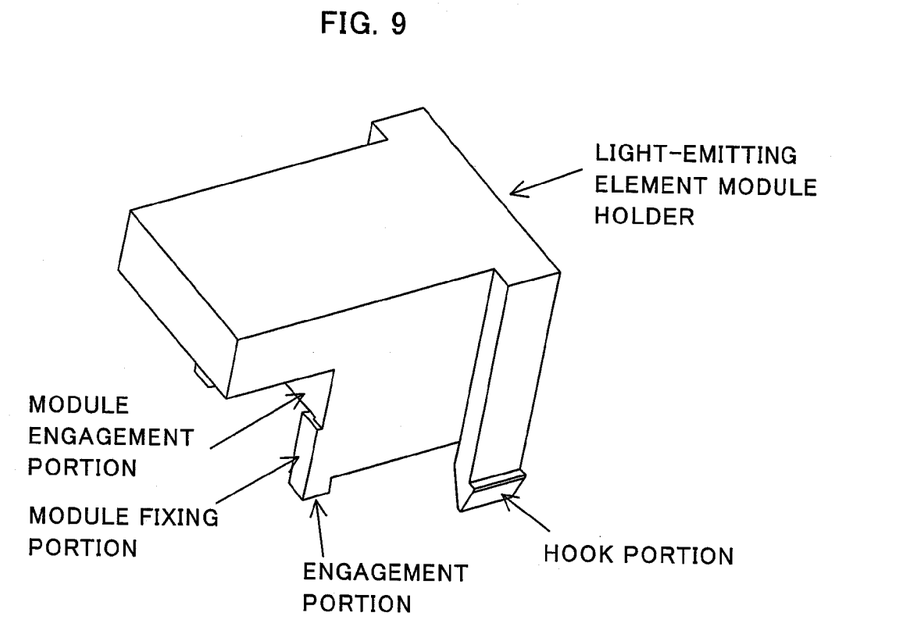
FIG. 9 is a perspective view of another exemplary light-emitting element module holder.

FIG. 9 is a perspective view of another exemplary light-emitting element module holder. In the above-described embodiment, fixing of the light-emitting element module holder to the printed circuit board is performed by use of the lifting prevention portions and the hook portions. However, the light-emitting element module holder may be configured to prevent lifting thereof by the hook portions only. Therefore, the lifting prevention portions as shown in FIG. 8 are not necessarily required. In the light-emitting element module holder shown in FIG. 9, engagement portions are provided in place of the lifting prevention portions. Like the above-described lifting prevention portions, the engagement portions are inserted into the unoccupied end portions of the positioning hole on opposite sides of the light-receiving element module so as to position the light-receiving element module; however, the engagement portions do not have claw portions for engagement with the back surface of the board.

Figure 10:
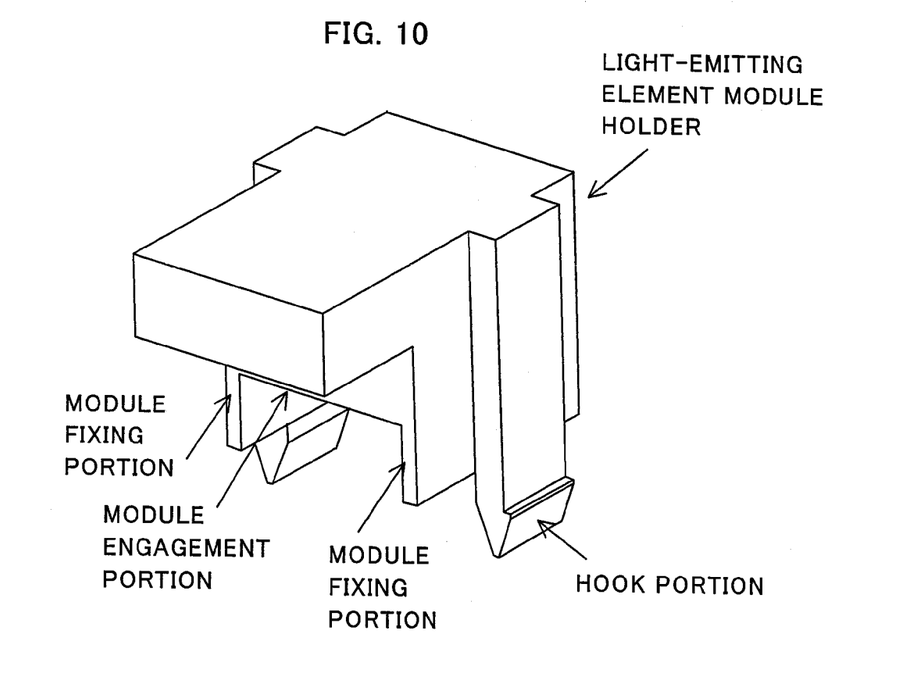
FIG. 10 is a perspective view of still another exemplary light-emitting element module holder.

FIG. 10 is a perspective view of still another exemplary light-emitting element module holder. In the example shown in FIG. 10, even the engagement portions, provided in the light-emitting element module holder of FIG. 9, are not present. The fixing and positioning function of the above-described lifting prevention potions or engagement portions can be achieved by the hook portions only, if the width (length in the front-rear direction) of the hook portions is increased so as to increase the strength thereof, or the hook portions are moved from the rearmost end of the light-emitting element module holder to a center thereof as shown in FIG. 10.

Notably, each of the light-emitting element module holders shown in FIGS. 9 and 10 includes module engagement portions for engaging the light-receiving element module in the vertical direction, and module fixing portions for laterally sandwiching the light-receiving element module and positioning the same. If hook portions having a necessary size (basically, length in the front-rear direction in FIG. 6) can be formed at an appropriate position, which is not limited to the rear end portion of the light-emitting element module holder and may be a position close to the center of each holder side surface, reliable fixing can be performed without provision of the lifting prevention portions (claw portions) or the engagement portions.

The hook portions of the light-emitting element module holder can be extended forward such that the inner sides of the hook portions serve as module-fixing portions. In this case, it is necessary to prevent interference between the positioning hole and fixing holes of the board. In order to avoid such interference, the width of the positioning projection of the light-receiving element module is reduced (the length of the positioning hole can be shortened through reduction in the width of the positioning projection of the light-receiving element module).

Figure 13:
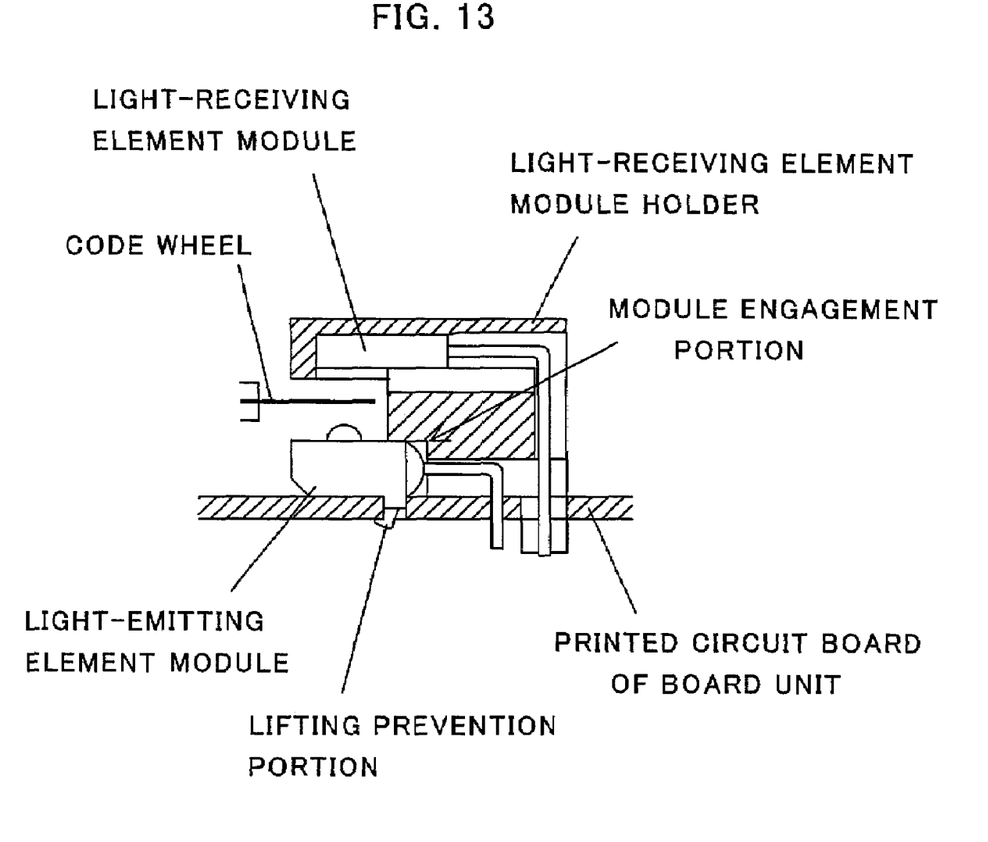
FIG. 13 is a partial sectional view showing an arrangement of a light-receiving element module and a light-emitting element module different from that shown in FIG. 7C.

FIG. 13 is a partial sectional view showing an arrangement of a light-receiving element module and a light-emitting element module different from that shown in FIG. 7C. In FIG. 13, a light-receiving element module is attached to a generally L-shaped module holder, and a light-emitting element module is mounted on the printed circuit board of the board unit. As in FIG. 7, the light-emitting element and the light-receiving element are disposed to face each other, and an optical modulation track portion of the code wheel is positioned and disposed in a gap between the facing light-emitting and light-receiving elements. Since the configuration shown in FIG. 13 is identical with that shown in FIG.

7 except that the arrangement of the light-emitting and light-receiving elements is reversed, its detailed description is not repeated.

What is claimed is:

1. An optical encoder device for a small-sized motor which includes a code wheel attached to a motor shaft extending outward from the motor, and a photosensor module for detecting rotation of an optical modulation track of the code wheel, the optical encoder device comprising:

the photosensor module being composed of a light-receiving element module accommodating a light-receiving element, and a light-emitting element module accommodating a light-emitting element, which modules are separate, paired components;

a board unit being fixed to an end surface of the motor, one of the paired light-receiving element module and light-emitting element module being mounted on a printed circuit board of the board unit; and a generally L-shaped module holder being mounted to the board unit, which accommodates the other of the paired light-receiving element module and light-emitting element module, after the code wheel is attached and fixed to the motor shaft along the axial direction of the motor shaft, whereby the light-emitting element and the light-receiving element are positioned such that these elements face each other via the optical modulation track portion of the code wheel.

2. An optical encoder device for a small-sized motor according to claim 1, wherein mutual positioning of the paired element modules in a front-rear direction is performed by fixing one element module and the module holder accommodating the other element module to the printed circuit board, mutual positioning of the paired element modules in a height direction is performed by bringing the one element module in engagement with a module engagement portion provided on the module holder, and mutual positioning of the paired element modules in a lateral direction is performed by sandwiching opposite lateral side surfaces of the one element module from the two sides by module fixing portions of the module holder provided at laterally opposite ends of the module holder.

3. An optical encoder device for a small-sized motor according to claim 2, wherein fixing of the module holder to the printed circuit board is performed by engaging a pair of hook portions provided on the module holder with corresponding holes provided in the printed circuit board.

4. An optical encoder device for a small-sized motor according to claim 3, wherein in addition to the hook portions of the modular holder, lifting prevention portions are provided, and the hook portions and the lifting prevention portions are engaged with corresponding holes provided in the printed circuit board, to thereby fix the module holder to the printed circuit board.

5. An optical encoder device for a small-sized motor according to claim 4, wherein the hook portions are provided at positions where the hook portions do not overlap legs of the lifting prevention portions as viewed from the front side of the module holder, and tip ends of the hook portions each have a triangular shape; and the hook portions are engaged with the board by means of elastic force of the hook portions, and engagement stepped portions of the hook portions are brought into contact with the back surface of the printed circuit board, whereby the hook portions are fixed to the printed circuit board.

6. A method of producing an optical encoder device for a small-sized motor which includes a code wheel attached to a motor shaft extending outward from the motor, and a photosensor module for detecting rotation of an optical modulation track of the code wheel, the method comprising:

providing the photosensor module which is composed of a light-receiving element module accommodating a light-receiving element, and a light-emitting element module accommodating a light-emitting element, which modules are separate, paired components;

fixing a board unit to an end surface of the motor, one of the paired light-receiving element module and light-emitting element module being mounted on a printed circuit board of the board unit; and attaching and fixing the code wheel to the motor shaft along the axial direction of the motor shaft, and mounting to the board unit a generally L-shaped module holder, which accommodates the other of the paired light-receiving element module and light-emitting element module, whereby the light-emitting element and the light-receiving element are positioned such that these elements face each other via the optical modulation track portion of the code wheel.

* * * * *